Dec. 5, 1950

R. C. GOERTZ
MODULATING CIRCUITS HAVING A FULL
WAVE ALTERNATING VOLTAGE OUTPUT 2,532,297

Filed Nov. 5, 1946

INVENTOR.
RAYMOND C. GOERTZ
BY
Herbert B. Thompson
his ATTORNEY.

Patented Dec. 5, 1950

2,532,297

UNITED STATES PATENT OFFICE 2,532,297

MODULATING CIRCUITS HAVING A FULL WAVE ALTERNATING VOLTAGE OUTPUT

Raymond C. Goertz, Hempstead, N. Y., assignor to The Sperry Corporation, a corporation of Delaware Application November 5, 1946, Serial No. 707,954

14 Claims. (Cl. 332—24)

My invention relates to modulators and particularly to modulators which are adapted to provide a full wave, modulated, alternating voltage output for use in servomotor control circuits.

The present application is a continuation-in-part of pending application Serial No. 403,618, filed in the United States Patent Office on July 23, 1941, now U. S. Patent No. 2,414,102, issued January 14, 1947. In that application, one form of the present invention is disclosed as embodied in a circuit for controlling the motor which drives an optical sight or in a servomotor control circuit which controls a prediction motor or a device functioning to provide compensated data or to correct the data which is supplied to a remote point for controlling the directing of a gun. In other words, as described in said application, Serial No. 403,618, the data (target orientation in azimuth and elevation) obtained from a sight is corrected to provide desired prediction data whereby although the sight is operated to track the target, the gun will be directed toward the future position of the target or toward that point in space at which the target should arrive simultaneously with a shell fired from the gun, sometimes called "shell burst position." In the present case, therefore, I have shown the novel modulator of the present invention as embodied in a servomotor control circuit for use in operating the sight under manual control or controlling a prediction motor, mainly for exemplary purposes.

The principal object of the present invention resides in providing a modulator for supplying a full wave, alternating output voltage having an amplitude and phase sense dependent upon the magnitude and polarity of a unidirectional voltage input, and one which is particularly adapted for use in servomotor control systems.

Another object resides in providing a modulator of the foregoing character which is characterized by the absence of a coupling transformer in the output thereof.

Another object resides in providing a modulator of either of the foregoing characters which is so arranged as to receive both a unidirectional and an alternating voltage input, the modulation components having an amplitude dependent upon the magnitudes of the two input voltages and a phase sense dependent upon the polarity and phase sense thereof.

Another object resides in providing a modulator of the preceding character in which alternating and unidirectional input or control voltages are mixed and the alternating output voltage of the modulator is proportional to the algebraic sum of these inputs.

A still further object resides in providing servomotor systems including control circuits embodying modulators of any of the foregoing characters.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

With the foregoing and other objects in view, my invention includes the novel elements and the combinations and arrangements thereof described below and illustrated in the accompanying drawings, in which—

Figure 4:
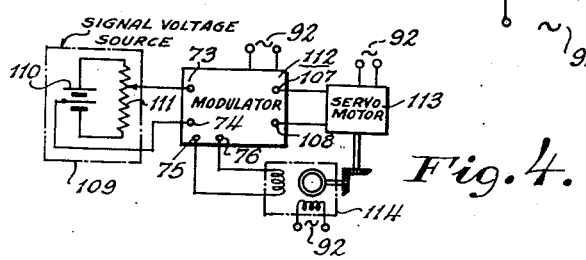

Fig. 4 schematically shows a servo system.

Figure 1:
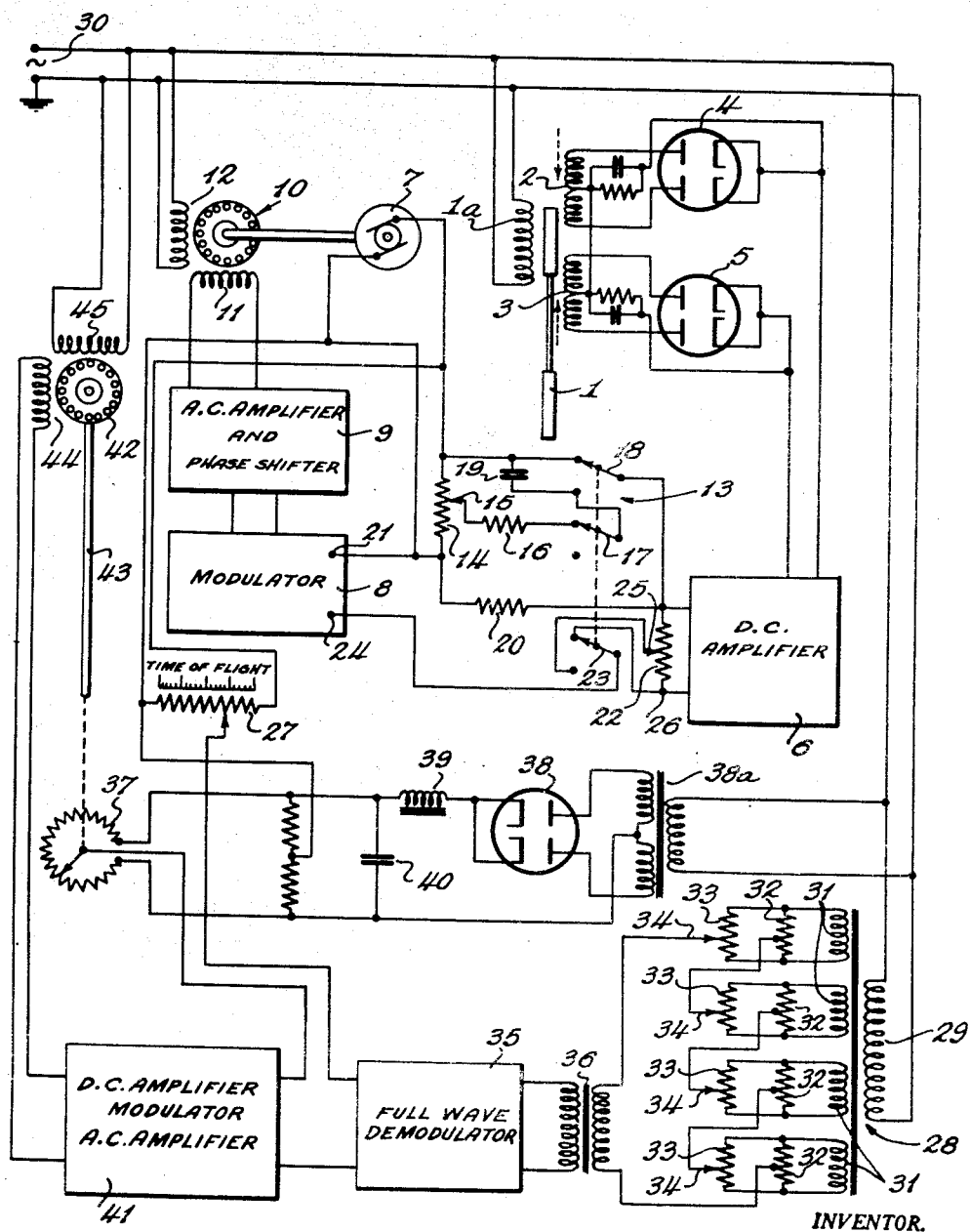
Fig. 1 shows schematically a circuit diagram of a servomotor and control circuit therefor embodying a modulator of the present invention.

As above indicated, the modulator of the present invention is particularly adapted for use in servomotor control purposes, and, in Fig. 1, I have shown an exemplary application of a servomotor and control system therefor wherein a manually operable controller is actuated to control one servo for driving a sight for target tracking purposes, while a second servomotor functions to add correction voltages to the voltages representing azimuth or elevation components of the target position as determined by the sight for the purpose of supplying future position data to the gun controls. In the schematic showing in Fig. 1, it will be understood that I have therein shown only that part of the control system or systems which drives the sight in either elevation or azimuth and corrects or compensates the data for the one plane of operation.

The manual controller comprises a primary or input winding $1a$ connected across A. C. source 30, pick-up or output windings 2 and 3 and a core of magnetic material which is operated by handle 1 to vary the coupling between winding $1a$ and windings 2, 3 and thereby provide a voltage output proportional in amplitude to the deflection of the handle and of a phase sense dependent upon the direction in which the handle is deflected from a neutral or zero voltage output position.

Deflection of, or pressure on, control handle 1 generates alternating control voltages in pick-up coils 2, 3. These voltages are rectified in full wave rectifiers 4, 5 and are then connected in series opposing relation. The dotted arrows near coils 2, 3 indicate the relative polarities of the voltages induced in the coils 2, 3. In place of rectifiers 4, 5, any phase-sensitive rectifier or demodulator may be used. The coils 2, 3 are connected in series opposition to form the input of such a demodulator.

The resultant direct voltage from the rectifiers 4, 5 (or demodulator of Fig. 2) is applied to the input of D. C. amplifier 6, wherein it is amplified. The output of D. C. amplifier 6 is connected in series bucking relationship to the output of speed generator 7, which is designed to provide a voltage output proportional to its speed. In the embodiment shown, generator 7 is a D. C. generator, either with a permanent magnet field or a field winding, energized by direct current, as will be described. Of course, the voltage output of generator 7 must be directly proportional to its speed.

Figure 2:
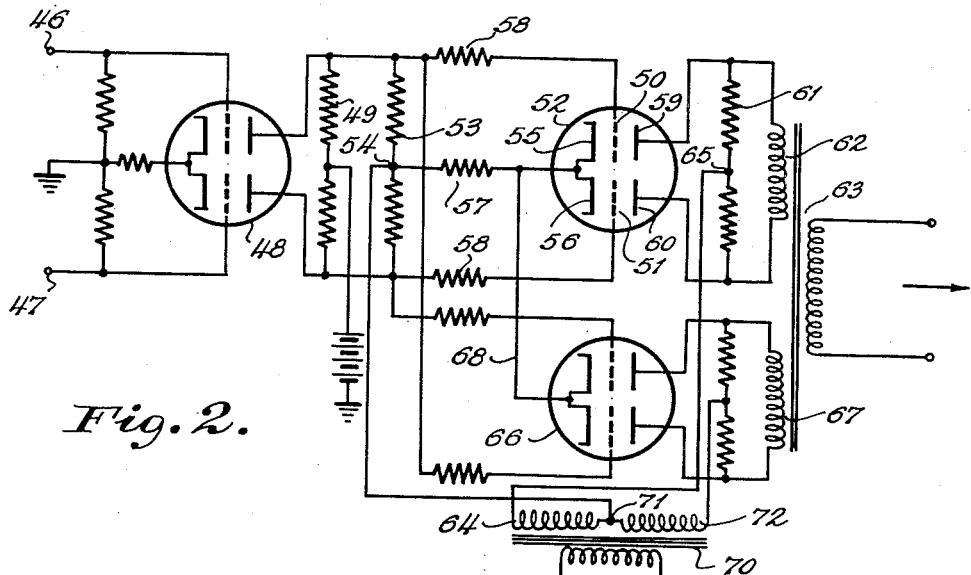
Fig. 2 shows in detail the circuit of one embodiment of the modulator of the present invention.

The combined direct control and speed generator voltages are applied to modulator 8, which transforms the applied direct voltage into an alternating voltage of proportional amplitude, and of a phase corresponding to the polarity of the input. That is, the A. C. output voltage of modulator 8 reverses phase when the D. C. input voltage reverses polarity. Fig. 2 shows a suitable circuit which may be used as such a modulator. The operation of this circuit will be later explained.

The output of modulator 8 will be an alternating voltage whose phase corresponds to the direction of deflection of control handle 1 and whose amplitude is proportional to the amplitude of the control handle deflection. It will be understood that certain cases may require that this proportionality be not strictly observed. Any suitable relationship may be used. This output is fed into an A. C. amplifier and phase shifter 9 whose output controls drive or servomotor 10. Phase shifter 9 insures that the energization of field winding 11 of drive motor 10 is in quadrature with that of field winding 12.

Incorporated in the input circuit of modulator 8 is the integrating circuit 13 for effecting velocity plus acceleration tracking control. This circuit comprises a potentiometer 14 connected across the speed generator output and having a movable arm 15 connected through a resistor 16 to the fixed contact of a single-pole single-throw switch 17. Connected across the two fixed contacts of a single-pole double-throw switch 18 is a condenser 19. One terminal of this condenser 19 is connected to a terminal of the speed generator 7, while the other terminal is connected to the movable contact of switch 17. The movable contact of switch 18 is connected to one output terminal of D. C. amplifier 6 and also to a resistor 20 whose other side is connected to the input terminal 21 of modulator 8. Resistor 20 is selected to have a high value of resistance, and to give a large time constant with condenser 19. A potentiometer 22 is connected across the output of D. C. amplifier 6, and a switch 23 can selectively connect the input terminal 24 of modulator 8 to either the movable arm 25 or the fixed terminal 26 of potentiometer 22. The three switches 23, 17, 18 are mechanically ganged so as to be operated simultaneously.

In the switch position shown in Fig. 1, the circuit will operate with straight velocity tracking; that is, the drive motor velocity will be proportional or will at least correspond to the control handle deflection, as described above. In this position, condenser 19 is charged through current limiting resistor 16 to a voltage somewhat less than the generator voltage, by means of the potentiometer 14. The time constant of the charging circuit 16, 19 is made small so that the condenser voltage will closely follow changes in generator voltage. The charging voltage depends on the position of arm 15 of potentiometer 14.

When switches 17 and 18 are switched to their other positions, the voltage across condenser 19 is placed in opposition to the generator voltage, across resistor 20. The voltage across this resistor 20 will be the generator voltage less the condenser voltage. This difference voltage will be much less than the voltage across potentiometer 22, which at the moment of switching was substantially equal to the generator voltage. In order to prevent abrupt speed change of drive motor 10 due to the excess of the voltage across potentiometer 22 over the voltage across resistor 20, switch 23 is actuated simultaneously with switches 17 and 18, and acts to reduce the effective voltage output of D. C. amplifier 6 to a value nearer the difference voltage.

Since the generator output voltage is greater than the charged condenser 19 voltage, the generator 7 will tend to further charge condenser 19, through resistor 20. The voltage drop across resistor 20 produced by this charging current must be substantially equal and opposite to the voltage across the effective part of potentiometer 22; otherwise, the drive motor 10 will speed up or slow down so as to make the drop across resistor 20 have a value equal to that across potentiometer 22. If control handle 1 is held in constant deflected position, a constant voltage will be developed across potentiometer 22. However, the voltage drop across resistor 20 will tend to decrease, since the charging current of condenser 19 will decrease as full charge is approached. The only way in which the voltage drop across resistor 20 can be maintained equal to that across the effective part of potentiometer 22 is for the generator to continually increase velocity to maintain constant charging current. Hence control handle 1 becomes an acceleration control in addition to velocity control, as it is with the switches 17, 18, 23 in their original position.

From another point of view, the generator voltage V must be equal to the sum of the voltage drop across resistor 20 and condenser 19. That is, $$V = iR + \frac{1}{c}\int i\, dt \qquad (\text{I})$$

where R is the resistance of resistor 20, c is the capacitance of condenser 19 and i is the current flowing in the circuit. It is clear that V is proportional to the tracking speed s. Also, the drive motor circuit causes the drop across resistor 20 to be maintained practically equal to the control voltage, which is proportional to deflection D of control handle 1. Hence, iR is proportional to D, or i is proportional to D. Neglecting proportionality constants, the above equation may be transformed into $$s = D + \int D \, dt \qquad (II)$$

This last equation shows that the tracking control has both a velocity and an acceleration component. That is, a constant deflection D will give a certain constant component of tracking velocity, as shown by the first term of the right side of the equation, and in addition will give a constantly increasing tracking velocity component due to the integrating effect of the second term. Hence the control handle becomes both a velocity and an acceleration control.

If the control handle 1 is released, so that zero voltage appears across potentiometer 22, the motor will drop its speed until the generator voltage output equals the condenser voltage. Thereafter the motor will travel at constant velocity; if the velocity should change, charging or discharging current from condenser 19 will flow through resistor 20, whose voltage drop will control the motor to restore its speed. The drive motor can be made to slow down only by reversing the deflection of the control handle, which therefore acts again as an acceleration control.

With zero control voltage, D becomes zero, so that the first term of the equation disappears, leaving only the integration term. Hence, S will be maintained constant at the value of the integrated term.

The importance of the combined velocity and acceleration control arises from the methods used in tracking. When an object is sighted, it is desirable to accelerate the sight to overtake the object, and then keep it trained on the object. The present device permits such operation. Acceleration is provided by control handle deflection, whereby the object may be overtaken, then release of the handle 1 will permit the sight to continue tracking at constant velocity.

A further advantage arisee where the sight may be tracking by itself at the proper velocity, but behind the object. Then deflection of the control handle will apply enough additional tracking velocity, by the first term of the last equation, to enable the sight to overtake the object. Then release of the handle will permit the sight to resume practically the same tracking velocity as before, since the integration term of the equation will be little affected by the brief period of increased velocity.

Another useful method of operation is to use straight velocity tracking until the object is sighted. Then throwing the ganged switch of Fig. 1 to its other position will automatically continue the same tracking velocity, with the control handle at neutral.

Fig. 1 also shows a D. C. operated prediction control circuit. The time-of-flight prediction voltage, which is proportional to the correction angle needed for time-of-flight correction, is derived from time-of-flight potentiometer 27 connected across the output of speed generator 7. This voltage is a direct voltage since the speed generator output is a direct voltage.

The other prediction voltages may be obtained from a transformer 28 whose primary 29 is energized directly from the alternating supply source 30. Transformer 28 has plural similar secondary windings 31, shown in this instance, for illustrative purposes only, as four in number. Each secondary winding 31 corresponds to one prediction quantity to be compensated for. It will be clear that as many secondary windings may be used as desired.

Each secondary winding 31 is shunted by a center-tapped resistor 32 of high resistance value, and by a potentiometer 33. The variable arm 34 of each potentiometer 33 is controlled in accordance with the value of the quantity for which prediction correction is required, in such fashion that the voltage between each variable arm 34 and its corresponding center tap of resistor 32 is proportional, by the same proportionality factor, to the prediction angle needed for correction of that quantity. This may be accomplished by driving the arms of linear wound potentiometers 33 from the mechanism which computes the required prediction angles, through cams which yield the required relationship, or by using direct drive and non-linear wound potentiometers 33 which will also yield the proper voltage-angle relationship. A suitable system is shown in Bond Patent 2,208,623. Any other means for obtaining these prediction voltages may be used.

These prediction voltages are added by being connected in series, as shown. Since these voltages are derived from similar plural secondary windings of the same transformer, their phase relationships will all be phase coincidence or phase opposition, so that they may be added arithmetically to produce the required resultant prediction voltage. The resultant is applied to the input of full wave demodulator 35 by means of transformer 36. The output of this demodulator 35 is a direct voltage whose amplitude corresponds to the amplitude of the input alternating voltage and whose polarity corresponds to the phase of the input voltage.

The output direct voltage from demodulator 35 is connected in series with the direct time-of-flight prediction voltage to give the total prediction voltage.

The prediction potentiometer 37 is energized with direct current. The energizing potential for potentiometer 37 is obtained from alternating supply line 30 by means of transformer 38a feeding full wave rectifier 38 having filter choke 39 and filter condenser 40. Choke 39 may be replaced by the field winding of speed generator 7 when an electromagnet field is used for that generator. In this way, since all the prediction circuit voltages are derived from the same source, namely, source 30, any fluctuation in source voltage will have equal proportional effect on all voltages, so that the circuit as a whole is independent of source voltage fluctuations. This arises from the fact that the balancing voltage from potentiometer 37 varies in the same way as the prediction voltages, upon any change in supply voltage.

In operation, potentiometer 37 is rotated until the voltage between its arm and its center point balances the total prediction voltage. This is done by connecting the total prediction voltage and the potentiometer voltage in opposition across the input of device 41, which includes a D. C. amplifier, a modulator which converts reversible polarity D. C. into reversing phase A. C., and an A. C. amplifier. Either or both the D. C. and A. C. amplifier may include rate circuits for insuring dead-beat and anti-hunting operation of prediction motor 42. Also, the A. C. circuits in device 41 may include proper phase shifting apparatus to cause the voltage output to be in quadrature with the voltage of line 30, to insure proper operation of two-phase prediction motor 42. The operation of this circuit is such as to position shaft 43 at the angle corresponding to the total prediction voltage.

Fig. 2 shows a push-pull modulator circuit suitable for use in the circuits of Fig. 1, for example, as the modulator 8. This modulator circuit converts a reversing polarity D. C. into a corresponding reversing phase A. C. The direct input voltage is applied to input terminals 46, 47 and is amplified in conventional D. C. amplifier 48, the amplified direct voltage appearing across center-tapped resistor 49. This amplified voltage is applied in opposition to the two grids 50, 51 of a twin-triode tube 52 by means of a center-tapped input resistor 53 whose center tap 54 is connected to cathodes 55, 56 of twin-triode 52 by means of a cathode bias resistor 57. Grid current-limiting resistors 58 may be used to prevent excessive grid current, should any grid swing positive.

Anodes 59, 60 are connected to the outside terminals of center-tapped resistor 61 in parallel with one primary 62 of output transformer 63. A source of alternating current 64 of line frequency is connected between the center taps 54 and 65 of resistors 53 and 61, respectively.

Let it be assumed that, for a particular polarity of input voltage, grid 50 is positive with respect to center tap 54 and grid 51 negative. Then, on positive half cycles of the applied A. C., anode 59 will have increased current, but anode 60 will have decreased current, compared to the current with zero input voltage to grids 50, 51. On negative half cycles neither anode will conduct. Hence, a voltage drop of a particular polarity appears across resistor 61, and only during positive half cycles of the supply voltage. This voltage drop will give a half-wave output from transformer 63 of one particular phase. If the input polarity were to reverse, making grid 51 positive with respect to point 54, and grid 50 negative, then, in the same way, anode 60 would have increased current, and anode 59 decreased current, and again only on positive half cycles of the applied A. C. This would cause a voltage drop to appear across resistor 61 of opposite polarity, giving an output half-wave from transformer 63 of opposite phase from that of the first instance described. Thus, the phase of the output voltage is sensitive to the polarity of the input voltage.

In order to provide a full wave output, which minimizes distorting harmonics, an exactly similar twin-triode 66 is used, with its input connected in parallel with the input to twin-triode 52. The output of tube 66 is connected to a second primary 67 of transformer 63 by a circuit identical to that of tube 52. The cathodes of tubes 52 and 66 are connected together as by conductor 68, and their anodes are energized from the same source. However, the anodes of tube 52 are energized in phase opposition with respect to the energization of the anodes of tube 66. This is accomplished by supplying both tubes from source 69 by means of a transformer 70 having a center-tapped secondary. The center tap 71 is connected to the center tap 54 of input resistor 53, and the outer terminal of one secondary section 64 is connected to the anodes of tube 52 by means of the center tap 65 of resistor 61, while the outer terminal of the other section 72 is connected in similar fashion to the anodes of tube 66.

As a result of this connection, tube 52 will conduct on half-cycles of the applied A. C. of one polarity, while tube 66 will conduct on the half-cycles of opposite polarity. As described above, the phase of the output voltage will reverse when the polarity of the input voltage reverses. The device of Fig. 2 is therefore a full wave modulator suitable for use with the circuit of Fig. 1.

Figure 3:
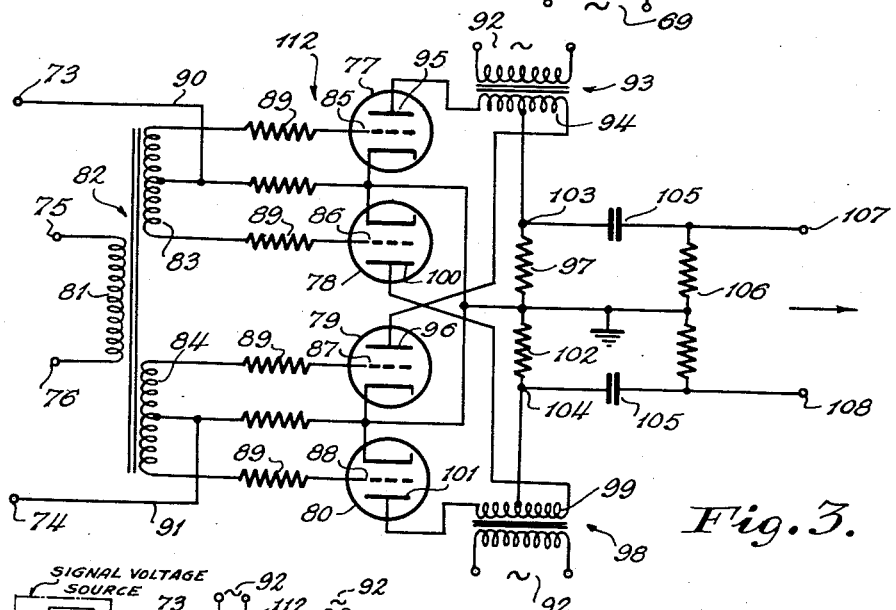
Fig. 3 illustrates a modified form of modulator.

In Fig. 3, I have shown a modified form of modulator which is characterized by the fact that no output transformer is utilized but the full wave, alternating voltage output is derived from across series-connected resistors in the plate cathode circuits of the electron tubes or electron discharge devices. This circuit like the circuit in Fig. 2 is a full wave modulator providing a full wave, alternating voltage output which has a phase sense depending upon the polarity of the unidirectional input voltage and an amplitude proportional to the magnitude of the unidirectional voltage. Additionally, this modulator is adapted and arranged to receive two input signals, one of a unidirectional character and the other alternating, the modulator functioning to mix these input signals and to provide an alternating output voltage which is proportional to the algebraic sum of the alternating and unidirectional input voltages.

Referring now to Fig. 3, the modulator has input taps 73 and 74 adapted for connection with a source of unidirectional signal voltage and input taps 75 and 76 which are adapted for connection to a source of alternating input or signal voltage. In this embodiment of my invention, I have shown four triodes 77, 78, 79 and 80 which operate as modulators or as amplifiers and modulators instead of two twin-triodes as shown in Fig. 2. The input taps 75, 76 are connected across the primary winding 81 of an input transformer 82 and the two center-tapped secondaries 83 and 84 of this transformer are connected respectively across the grids 85 and 86 of tubes 77 and 78 and across grids 87 and 88 of tubes 79 and 80. Current limiting resistors 89 may be connected in the grid leads of each tube. It will be seen that the alternating input signal voltage is applied in out-of-phase relation to the grids of each pair of electron discharge devices, that is, in out-of-phase relation to the grids of tubes 77, 78 and in like manner to the grids of tubes 79 and 80. The input taps 73, 74, to which the unidirectional input signal voltage is applied, are connected through leads 90 and 91 respectively to the center taps of the secondaries 83, 84 of transformer 82. Hence, the unidirectional voltage input is applied in like polarity sense to the grids of each pair of tubes but in opposite polarity sense to the respective pairs. In other words, grids 85 and 86 will receive the same polarity while grids 87 and 88 will have like polarities.

In the embodiment of Fig. 3, two transformers are shown for supplying the plate potentials to the plates of the modulating tubes, each having its primary connected to a source of alternating reference voltage 92. One of these transformers, such as transformer 93, has its center-tapped secondary 94 connected between the plate 95 of tube 77 and plate 96 of tube 79. The center tap is connected through an impedance, preferably a resistor, 97 to the cathodes of the tubes which may be connected together as shown. Similarly, the other plate supply transformer 98 has a center-tapped secondary 99 which is connected between the plate 100 of tube 78 and the plate 101 of tube 80. The center tap of secondary 99 is connected through an impedance or resistor 102 to the cathodes of the tubes. The output of the modulator is derived from taps 103 and 104 across which the resistors 97 and 102 are connected in series. The alternating voltage appearing across the taps 103, 104 is supplied through filtering condensers 105 to center-tapped resistor 106 connected across the output taps 107, 108. The center tap of resistor 106 is preferably connected to ground as shown and to the cathode of the tubes.

The operation of the circuit of Fig. 3 is generally similar to that of Fig. 2 in that a full wave, alternating voltage output is obtained which has a phase sense dependent upon the polarity of the unidirectional input voltage and also the phase sense of the alternating input voltage, the latter being the same frequency as the source 92 or derived therefrom and of predetermined phase relationship therewith. Additionally, the amplitude of the output of the demodulator will be dependent upon the magnitude of the unidirectional signal voltage, or proportional to the algebraic sum of the unidirectional and alternating input voltages when two such inputs are used.

In Fig. 4, I have schematically shown a servomotor system embodying a modulator which may be of the character shown in Fig. 2 when only a unidirectional input voltage is used and which may be of the character shown in Fig. 3 when unidirectional and alternating input signals are employed. In this case, I have shown the primary control signal, which is of a unidirectional character, as derived from a potentiometer for exemplary purposes and I have also shown an alternating current speed generator as the source of the alternating input voltage. The signal voltage source indicated generally at 109 comprises a source of D. C. or battery 110 connected across the resistance 111 of a potentiometer. The center tap on the battery 110 is connected to one input terminal 74 of the modulator 112 corresponding to that shown in Fig. 3, and the movable contact of the potentiometer is connected to the other input tap 73 of the modulator. Hence, a reversible polarity, unidirectional signal voltage is applied to one input of the modulator. The output of the modulator is connected to a servomotor 113 as shown, the output of the potentiometer serving as the primary control signal in controlling the direction and rate of operation of the motor. The motor output shaft drives the rotor of an A. C. speed generator 114. This speed generator may be of the character of that shown in the U. S. patent to Riggs, No. 2,206,920, and comprises an input winding connected across alternating current source 92, a rotor and an output winding which is connected across the input taps 75, 76 of the modulator. The alternating voltage output of the speed generator 114 is proportional in amplitude to the speed of the rotor and its phase sense depends upon the direction of rotation of the rotor. This speed voltage is used in damping the operation of the servomotor to prevent excessive hunting.

It will be observed that the modulator of Fig. 3 is particularly adapted to provide an alternating output voltage for controlling the servomotor in accordance with unidirectional and alternating input voltages such as those derived from signal source 109 and speed voltage generator 114. The modulator functions to mix these signals and to provide a full wave, alternating voltage output which is dependent thereon in the manner hereinabove described. Additionally, no output transformer is necessary which is advantageous under many circumstances.

In Figs. 1 and 2, tubes 4, 5, 38, 48, 52 and 66 have been illustrated as being of the twin or duplex type. It is obvious that two separate single tubes could equally well be used. Also, tubes 48, 52, 66 and 77—80 need not be of the triode type, as shown, but may be of any type of amplifier tube incorporating a control grid.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A modulator circuit for converting variable reversible polarity direct voltages into corresponding reversible phase alternating voltages, comprising a pair of electron discharge paths each including a cathode, control grid and anode, means for applying said direct voltage in opposite polarity between the two grids and their corresponding cathodes, means for applying said alternating voltage cophasally between said anodes and their cathodes, a load resistor connected between each anode and the point of application of the alternating voltage, and an output circuit connected between said anodes.

2. A modulator circuit comprising a source of direct voltage, a pair of electron discharge paths, a source of alternating voltage, means connecting said alternating voltage in series with each of said paths, means for oppositely controlling the discharge along said paths under control of said direct voltage, in such manner that one path will be conductive for one polarity of said direct voltage and the other path will be conducted for reverse polarity of said direct voltage, and means for connecting the outputs of said paths in series opposition to form a net output, so that the net output will contain an alternating output voltage whose phase corresponds to the polarity of said direct voltage.

3. A modulator circuit as in claim 2, further comprising a second pair of electron discharge paths, means connecting said alternating voltage in series with said second pair of paths and in opposite phase with respect to the connection to said first pair of paths, means for oppositely controlling the discharge along said second pair of paths under control of said direct voltage, means for connecting the outputs of said second pair of paths in series opposition to form a second net output, and means combining said net outputs to form a full wave total output.

4. A modulator comprising a source of input voltage, an output, and two pairs of electron discharge devices each including a grid, cathode and plate elements, a source of alternating reference voltage, means for applying said input voltage in like polarity sense to the grids of the devices in each pair but to the grids of one pair in the opposite polarity sense to that applied to the other pair, means for supplying said reference voltage in out-of-phase relation to the plates of the devices in each pair, a common impedance in the plate-cathode circuits of two of said devices, one in each pair, and a second common impedance in the plate-cathode circuits of the other two devices, said impedances being so connected relative to each other and said output as to provide an alternating current output.

5. A modulator comprising a source of input voltage, an output, and two pairs of electron discharge devices each including a grid, cathode and plate elements, a source of alternating reference voltage, means for applying said input volt-age in like polarity sense to the grids of the devices in each pair but to the grids of one pair in the opposite polarity sense to that applied to the other pair, transformer means for supplying said reference voltage in out-of-phase relation to the plates of said devices and comprising a pair of center tapped secondaries, said secondaries being respectively connected across the plates of difference devices and across those in different pairs, and impedance means connected in circuit with the center taps of said secondaries and the cathodes of said devices and in series across said output.

6. A modulator comprising a source of alternating input voltage, a source of unidirectional input voltage, an output, and two pairs of electron discharge devices each including a grid, cathode and plate elements, a source of alternating reference voltage, means for applying said unidirectional input voltage in like polarity sense to the grids of the devices in each pair but to the grids of one pair in the opposite polarity sense to that applied to the other pair, means for applying said alternating input voltage to both pairs of devices but in opposite phase sense to the grids of the devices in each pair, a pair of means for supplying said reference voltage in out-of-phase relation respectively to the plates of a different set of two of said devices, each set having one in each pair, and means connected in the cathode-plate circuits of said devices for supplying the voltage drop thereacross to said output.

7. A modulator comprising a source of alternating input voltage, a source of unidirectional input voltage, a source of alternating input voltage, an output, and two pairs of electron discharge devices each including a grid, cathode and plate elements, a source of alternating reference voltage, means for applying said unidirectional input voltage in like polarity sense to the grids of the devices in each pair but to the grids of one pair in the opposite polarity sense to that applied to the other pair, means for applying said alternating input voltage to both pairs of devices but in opposite phase sense to the grids of the devices in each pair, transformer means for supplying said reference voltage in out-of-phase relation to the plates of said devices and comprising a pair of center tapped secondaries, said secondaries being respectively connected across the plates of different devices and across those in different pairs, and impedance means connected in circuit with the center taps of said secondaries and the cathodes of said devices and in series across said output.

8. In a servomotor system in which the output of an amplifier is connected to control the direction and rate of operation of the servomotor and the amplifier input is connected to a source of unidirectional signal voltage for controlling the same, an amplifier comprising a modulator having an output for supplying an alternating control voltage, two pairs of electron discharge devices each including a grid, cathode and plate elements, a source of alternating reference voltage, means for applying said signal voltage in like polarity sense to the grids of the devices in each pair but to the grids of one pair in the opposite polarity sense to that applied to the other pair, means for supplying said reference voltage in out-of-phase relation to the plates of the devices in each pair, a common impedance means in the plate-cathode circuits of two of said devices, one in each pair, and a second common impedance means in the plate cathode circuits of the other two devices, said impedances being so connected relative to each other and said output as to provide an alternating voltage across said output.

9. In a servomotor system in which the output of an amplifier is connected to control the direction and rate of operation of the servomotor and the amplifier input is connected to a source of unidirectional signal voltage for controlling the same, an amplier comprising a modulator having an output for supplying an alternating control voltage, two pairs of electron discharge devices each including a grid, cathode and plate elements, a source of alternating reference voltage, means for applying said signal voltage in like polarity sense to the grids of the devices in each pair but to the grids of one pair in the opposite polarity sense to that applied to the other pair, transformer means for supplying said reference voltage in out-of-phase relation to the plates of said devices and comprising a pair of center tapped secondaries, said secondaries being respectively connected across the plates of different devices and across those in different pairs, and impedance means connected in circuit with the center taps of said secondaries and the cathodes of said devices and in series across said output.

10. In a servomotor system in which the output of an amplifier is connected to control the direction and rate of operation of the servomotor and the amplifier input is connected to a source of unidirectional signal voltage for controlling the same, an amplier comprising a modulator having an output for supplying an alternating control voltage, two pairs of electron discharge devices each including a grid, cathode and plate elements, a source of alternating reference voltage, means for applying said signal voltage in like polarity sense to the grids of the devices in each pair but to the grids of one pair in the opposite polarity sense to that applied to the other pair, means for supplying said alternating signal voltage in opposite phase sense to the grids of the devices in each pair, a pair of means for respectively supplying said reference voltage in out-of-phase relation to the plates of a different set of two of said devices, each set having one in each pair, and means connected in the cathode plate circuits of said devices for supplying the voltage drop thereacross to said output.

11. In a servomotor system in which the output of an amplifier is connected to control the direction and rate of operation of the servomotor and the amplifier input is connected to a source of unidirectional signal voltage for controlling the same, an amplifier comprising a modulator having an output for supplying an alternating control voltage, two pairs of electron discharge devices each including a grid, cathode and plate elements, a source of alternating reference voltage, means for applying said signal voltage in like polarity sense to the grids of the devices in each pair but to the grids of one pair in the opposite polarity sense to that applied to the other pair, means for supplying said alternating signal voltage to both pairs of devices but in opposite phase sense to the grids of the devices in each pair, a pair of transformers for supplying said reference voltage to the plates of said devices, each transformer comprising a center tapped secondary, said secondaries being respectively connected across the plates of different devices and across those in different pairs, and impedance means connected in circuit with the center taps of said secondaries and the cathodes of said devices and in series across said output.

12. A modulator of the character recited in claim 4 in which the impedances in the plate-cathode circuits are resistances.

13. A modulator of the character recited in claim 5 in which the impedance means connected with the transformer center taps and the cathodes comprise a pair of resistors.

14. A modulator of the character recited in claim 8 in which the common impedances are resistors connected in series across the output.

RAYMOND C. GOERTZ.

REFERENCES CITED

The following references are of record in the file of this patent:

UNITED STATES PATENTS

| Number | Name | Date |
|---|---|---|
| 2,210,015 | Usselman | Aug. 6, 1940 |
| 2,220,201 | Bliss | Nov. 5, 1940 |
| 2,380,947 | Crosby | Aug. 7, 1945 |
| 2,409,970 | Agins | Oct. 22, 1946 |
| 2,424,569 | Moseley et al. | July 29, 1947 |